(12) United States Patent
Ma et al.

(10) Patent No.: US 9,324,303 B2
(45) Date of Patent: Apr. 26, 2016

(54) OPEN ANGLE DETECTION AND PROCESSING APPARATUS AND METHOD

(71) Applicant: Intel Corporation, Santa Clara, CA (US)

(72) Inventors: Liwei Ma, Beijing (CN); Jiqiang Song, Beijing (CN); Gansha Wu, Beijing (CN); Zhuo Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/993,664

(22) PCT Filed: Dec. 27, 2012

(86) PCT No.: PCT/CN2012/087633
§ 371 (c)(1),
(2) Date: Feb. 27, 2014

(87) PCT Pub. No.: WO2014/101036
PCT Pub. Date: Jul. 3, 2014

(65) Prior Publication Data
US 2014/0184489 A1    Jul. 3, 2014

(51) Int. Cl.
*G06F 3/033* (2013.01)
*G09G 5/37* (2006.01)
(Continued)

(52) U.S. Cl.
CPC .............. *G09G 5/37* (2013.01); *G06F 1/1616* (2013.01); *G06F 1/1677* (2013.01); *G06F 3/0346* (2013.01); *G06F 3/0354* (2013.01); *G06F 3/1446* (2013.01); *G06F 2200/1637* (2013.01)

(58) Field of Classification Search
CPC ..... G06F 1/1616; G06F 1/1618; G06F 1/162; G06F 1/1667; G06F 1/1677; G06F 1/1641; G06F 1/1647; G06F 1/1622; G06F 2200/1614; G06F 3/048; G06F 3/04815; G06F 3/0346; G06F 3/04845; G06F 3/00; G06F 3/0353; G06F 3/011

USPC ........... 345/156–158, 168–169, 1.1, 1.2, 1.3, 345/2.1, 2.2, 2.3, 3.1, 4, 5, 6
See application file for complete search history.

(56) References Cited

U.S. PATENT DOCUMENTS 6,788,292 B1 * 9/2004 Nako et al. .................... 345/173
7,184,025 B2 * 2/2007 Williams et al. .............. 345/169
(Continued)

FOREIGN PATENT DOCUMENTS

CN      101788850      7/2010
CN      102227766      10/2011
(Continued)

OTHER PUBLICATIONS

English Language Machine Translation of JP-2002-140159.*
(Continued)

*Primary Examiner* — Jason Mandeville
(74) *Attorney, Agent, or Firm* — Schwabe, Williamson & Wyatt, P.C.

(57) ABSTRACT

Embodiments of techniques and apparatus for open angle detection and processing are described. In embodiments, an apparatus may comprise a first panel having a display, a second panel movably coupled with the first panel. The first and second panels variably define an angle between these two panels. One or more sensors may be disposed in the apparatus and configured to detect an angle change event of the variable angle between two panels. The angle changing information may be used by an application to vary output of the application onto the display. Other embodiments may be described and claimed.

11 Claims, 13 Drawing Sheets

(51) Int. Cl.
*G06F 3/0346* (2013.01)
*G06F 3/0354* (2013.01)
*G06F 3/14* (2006.01)
*G06F 1/16* (2006.01)

(56) References Cited

U.S. PATENT DOCUMENTS

| | | | | |
|---|---|---|---|---|
| 7,636,071 | B2 * | 12/2009 | O'Gorman | 345/1.1 |
| 7,864,517 | B2 * | 1/2011 | Miller et al. | 361/679.27 |
| 2007/0120762 | A1 * | 5/2007 | O'Gorman | 345/1.1 |
| 2009/0303208 | A1 * | 12/2009 | Case et al. | 345/204 |
| 2010/0134412 | A1 * | 6/2010 | Narita | G06F 1/1616 345/156 |
| 2011/0248967 | A1 * | 10/2011 | Wang | G09G 3/344 345/204 |
| 2012/0299813 | A1 * | 11/2012 | Kang | G06F 1/1641 345/156 |
| 2012/0326971 | A1 * | 12/2012 | Zhou | 345/156 |
| 2013/0205142 | A1 * | 8/2013 | Jung | G06F 1/1677 713/300 |

FOREIGN PATENT DOCUMENTS

| | | |
|---|---|---|
| CN | 102714670 | 10/2012 |
| JP | 2002140159 A * | 5/2002 |
| JP | 2009222951 | 10/2009 |
| WO | WO 2011083782 A1 * | 7/2011 |
| WO | WO2012017763 A1 | 2/2012 |

OTHER PUBLICATIONS

International Search Report and Written Opinion mailed Oct. 3, 2013 for International Application No. PCT/CN2012/087633, 12 pages.
International Preliminary Report on Patentability mailed Jul. 9, 2015 for International Application No. PCT/CN2012/087633; 7 pages.

* cited by examiner

OPEN ANGLE DETECTION AND PROCESSING APPARATUS AND METHOD

CROSS REFERENCE TO RELATED APPLICATIONS

The present application is a national phase entry under 35 U.S.C. §371 of International Application No. PCT/CN2012/087633, filed Dec. 27, 2012, entitled "OPEN ANGLE DETECTION AND PROCESSING APPARATUS AND METHOD", which designated, among the various States, the United States of America. The Specification of the PCT/CN2012/087633 Application is hereby incorporated by reference.

BACKGROUND

In display technology, viewing angle of a display device is often defined as the maximum angle at which a display can be viewed with acceptable visual performance. Beyond a specified viewing angle, colors, contrast, and brightness may drastically change thus giving a poor visual appearance. Therefore, a display device with a bigger viewing angle may generally provide a better user experience.

However, user experience is also related to another kind of "viewing angle," which refers to the angle at which a user views the display. For example, for consumption three-dimensional (3D) media, a good viewing angle may facilitate a user in achieving a more realistic 3D experience. Hereinafter, unless the context clearly indicates otherwise, the term "viewing angle" denotes "the angle at which a user views the display."

Thus, routinely a user would adjust a display to achieve a good viewing angle at a proper distance, not only to provide better visual performance but also to potentially mitigate workplace health problems relating to computer use. For computing devices with an attached display such as a notebook computer, a good viewing angle normally can be achieved by tilting the display from its base. The angle between the display and the base is often referred to as the "open angle."

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
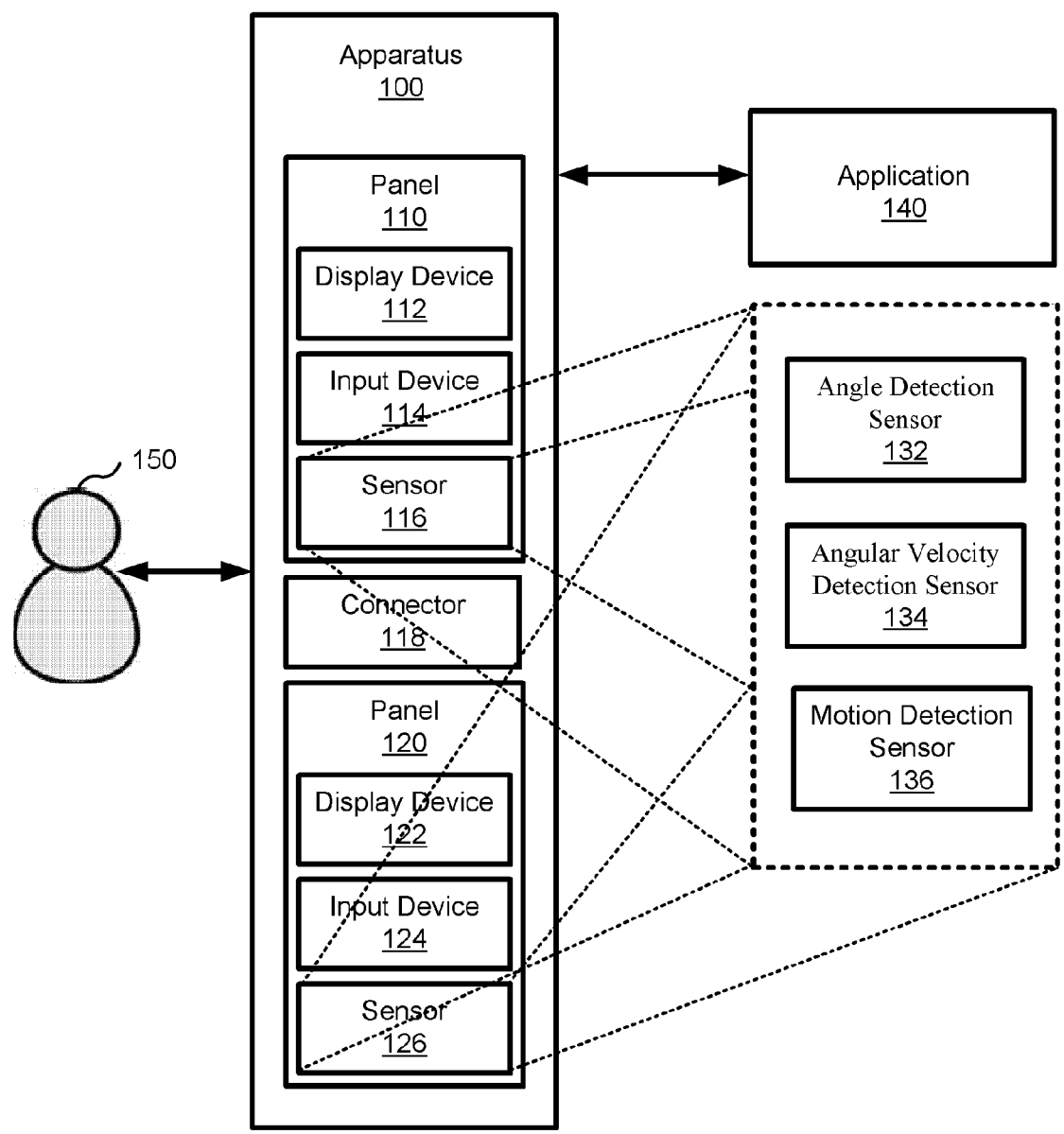
FIG. 1 is a block diagram illustrating an example apparatus incorporating aspects of the present disclosure.

Embodiments of the present disclosure relate to techniques and apparatus for open angle detection and processing. In embodiments, an apparatus may comprise a first panel having a display, a second panel movably coupled with the first panel. The first and second panels variably define an angle between these two panels. One or more sensors may be disposed in the apparatus and configured to detect an angle change event of the variable angle between two panels. The angle changing information may be used by an application to vary output of the application onto the display.

The apparatus incorporated with these teachings may be an information processing system or a computing device. In particular, the information processing system or computing device may be a mobile computing device. The mobile device may be one of, but not limited to, a mobile phone, a smartphone, a tablet computer, an ultra-mobile PC, a wearable computer, a personal digital assistant, a portable media player, a portable game player, and so forth.

For example, the mobile device may be a booklet computer with dual-touchscreen, where an application on the booklet computer will vary its output in response to changes to the relative angular disposition of the dual-touchscreen. As another example, the mobile device may be a convertible tablet having a display screen with an attached keyboard, where an application on the convertible tablet will vary its output in response to changes to the relative angular disposition of the display screen and the attached keyboard. The display screen and the keyboard may be attached via a swivel or rotating hinge.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Where the disclosure recites "a" or "a first" element or the equivalent thereof such disclosure includes one or more such elements, neither requiring nor excluding two or more such elements. Further, ordinal indicators (e, first, second or third) for identified elements are used to distinguish between the elements, and do not indicate or imply a required or limited number of such elements, nor do they indicate a particular position or order of such elements unless otherwise specifically stated.

The description may use the phrases "in one embodiment", "in an embodiment", "in another embodiment", "in embodiments", or "in various embodiments" which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, a block diagram is shown illustrating an example apparatus 100 incorporating aspects of the present disclosure, in accordance with various embodiments. In embodiments, apparatus 100 may include a panel 110 and another panel 120. One or more connectors 118 may be configured to couple panel 110 with panel 120. In embodiments, panel 110 may include a display device 112, an input device 114, and/or sensors 116. Similarly, panel 120 may include a display device 122, an input device 124, and/or sensors 126. Moreover, similar components may have similar functions but with different structures. In embodiments, panel 110 and panel 120 may be respectively disposed on two movable portions of apparatus 100, enabling variable definition of an angle between panels 110 and 120. In alternate embodiments, apparatus 100 may only have one panel wherein an open angle may be formed between the panel and an external physical, or an imaginary level surface (a plane with constant gravity potential).

In embodiments, panel 110 and panel 120 may be coupled via one or more connectors 118 wherein a connector 118 may be a swivel hinge, a rotating hinge, or a magnetic hinge. In embodiments, panel 110 and panel 120 may be detachable and communicated via wireless wherein they may be re-connected via a rotating hinge or a magnetic hinge. The detachable panels may still form an open angle while they are detached. In embodiments, two panels may be pivotally coupled together in a manner that enable an open angle, from 0 degree to 360 degrees or a lesser degree, to be formed between the two portions, to be described more fully below.

As will be described in more detail below, the various components of apparatus 100 are arranged and/or configured to enable an application on apparatus 100 to vary its outputs in response to changes in the angle between panels 110 and 120, or between panel 110/120 and an imaginary surface. Except for these teachings of the present disclosure, as alluded to earlier, apparatus 100 may be an information processing system or a computing device. In particular, apparatus 100 may be a mobile computing device. The mobile device may be one of, but not limited to, a mobile phone, a smartphone, a tablet computer, an ultra-mobile PC, a wearable computer, a personal digital assistant, a portable media player, a portable game player, and so forth.

For example, the mobile device may be a laptop, notebook or subnotebook computer, such as, an Ultrabook® designed by Intel® Corporation, or a Macbook® or Macbook Air® available from Apple Inc., enhanced with the teachings of the present disclosure. As a further example, the mobile device may be a slate, convertible, hybrid, or mini computing tablet such as the Microsoft Surface® available from Microsoft® Corporation, or the Galaxy Tab®, available from Samsung® Corporation, enhanced with the teachings of the present disclosure. As still another example, the mobile device may be an e-book or e-reader, such as the Nook™ available from Barnes & Noble® Booksellers, Inc., or a smartphone, such as the Lumia®, available from Nokia® Corporation, enhanced with the teachings of the present disclosure. These examples are meant to be illustrative but not limiting.

Still referring to FIG. 1, in embodiments, display device 112 or 122 may be an output device for presentation of information in visual or tactile form. In embodiments, display device 112 or 122 may include a 2-dimensional display such as a cathode ray tube display (CRT), a light-emitting diode display (LED), an electroluminescent display (ELD), an electronic paper (E-Paper), an electronic ink (E-Ink), a plasma display panel (PDP), a liquid crystal display (LCD), an organic light-emitting diode display (OLED), an interferometric modulator display (IMOD), etc. In embodiments, the display device 112 or 122 may include a 3-dimensional display such as a volumetric display (VD), a holographic display (HD), a laser lighting display (LLD), etc.

Input device 114 or 124 may be a peripheral device used to provide data and control signals to apparatus 100. In embodiments, input device 114 or 124 may include one or more of keyboards, stylus or pens, pointing devices, composite devices, imaging and video input devices, audio input devices, etc. It should be noted that a user may use tactile or positioning technologies to select, unselect, activate, deactivate, or move objects displayed on display device 112 or 122. Thus, in embodiments, display device 112 or 122 may alternatively function as an input device beyond its traditional function for visual or tactile display.

Sensors 116 or 126 may be configured to measure a physical property and convert it into a signal which can be read by another component of apparatus 100. In embodiments, sensors 116 or 126 may include angle detection sensor 132, angular velocity detection sensor 134, and/or motion detection sensor 136.

Angle detection sensor 132 may be configured to measure the open angle formed between panel 110 and panel 120 and/or changes to the open angle formed. In embodiments, angle detection sensor 132 may be configured with a piezoelectric accelerometer to measure the open angle by measuring the piezoelectric effect of certain materials disposed in panel 110 and/or panel 120, as the panels move towards or away from each other. In embodiments, angle detection sensor 132 may be configured with an inclinometer to measure open angle by measuring the tilt angle of panel 110 and/or panel 120 relative to the earth's ground plane. In embodiments, angle detection sensor 132 may be configured with a displacement sensor to measure the open angle by measuring the relative displacement, either linear or angular, between panel 110 and panel 120. Recognizing that the foregoing examples were merely indicative of potential underlying sensors or technologies of angle detection sensor 132, in other embodiments, different sensors or technologies may also be used by angle detection sensor 132 to measure the open angle formed between panel 110 and panel 120 or changes to the open angle formed.

Angular velocity detection sensor 134 may be configured to measure the angular velocity of panel 110 and/or panel 120 moving away or towards each other. In embodiments, angle velocity detection sensor 134 may be configured with a rate sensor to measure the angular velocity. In embodiments, angle velocity detection sensor 134 may be configured with a gyroscope to measure the angular velocity. In embodiments, angle velocity detection sensor 134 may be configured with a rotary encoder to detect the angular velocity. Recognizing that the foregoing examples were merely indicative of potential underlying sensors or technologies of angular velocity detection sensor 134, in other embodiments, different sensors or technologies may also be used by angular velocity detection sensor 134 to measure the angular velocity of panel 110 and/or 120 moving away or towards each other.

Motion detection sensor 136 may measure whether panel 110 or panel 120 is actively moving, thus changing the spatial relationship between two panels. For example, viewing orthogonally from the plane of FIG. 11 or FIG. 12, a panel 1110, 1120, 1210, or 1220 may actively move, such as rotating relative to the other panel, to change the open angle formed between the two panels, while the other panel remain still. In embodiments, motion detection sensor 136 may be configured with pressure sensors to measure the pressure of a medium, such as gas or liquid, stored in connector 118, panel 110, and/or panel 120. The pressure sensors may be configured to measure pressure independently caused by the motion of panel 110 and/or panel 120, thereby detecting which panel is actively moving. In embodiments, motion detection sensor 136 may be configured with a piezoelectric accelerometer to measure the piezoelectric effect of certain materials disposed in panel 110 and/or panel 120, thereby detecting which panel is actively moving. In embodiments, motion detection sensor 136 may be configured with torque sensors to measure the torque change caused independently by the motion of panel 110 and/or panel 120, thereby detecting which panel is actively moving. Recognizing that the foregoing examples were merely indicative of potential underlying sensors or technologies of motion detection sensor 136, in other embodiments, different sensors or technologies may also be used by motion detection sensor 136 to detect an actively moving panel.

Moreover, in embodiments, one sensor may enable apparatus 100 to perform various functions. For example, a piezoelectric accelerometer based sensor may be configured to perform all functions of angle detection sensor 132, angular velocity detection sensor 134, and motion detection sensor 136 as illustrated above.

A user 150 may operate apparatus 100 by moving panel 110 and panel 120 independently or collectively, thereby changing the open angle formed between panel 110 and panel 120. Information of such angle change may be detected by angle detection sensor 132. Information of the angular velocity of a panel may be detected by angular velocity detection sensor 134. Information of which panel is actively moving may be detected by motion detection sensor 136.

In embodiments, apparatus 100 may report the information detected by each sensor, sensor-dependant information, to application 140. In embodiments, application 140 may translate the sensor-dependant information, based at least in part on the related semantics of application 140, into a user input to application 140. In embodiments, application 140 may be running locally on apparatus 100 or remotely at another computing device, such as a remote server, coupled with apparatus 100 via one or more wired and/or wireless, private and/or public, local and/or wide area networks. Thus, in some embodiments, one or more aspects of application 140 may be configured to operate on a device or apparatus that is separate from apparatus 100 which generates the open angle information. In other embodiments, one or more aspects of application 140 may be operated on apparatus 100 where the open angle information are generated.

In some embodiments, the sensor-dependant information may be received passively by application 140 such as via one or more reports made by apparatus 100. In other embodiments, application 140 may be configured to actively request and/or otherwise obtain the sensor-dependant information from apparatus 100. In one embodiment, apparatus 100 may have an API for application 140 to call, and be provided with the sensor-dependant information. As an example, application 140 may call a device driver or a controller hub in apparatus 100 to provide the sensor-dependant information. In another embodiment, in an event driven programming model, apparatus 100 may allow application 140 to register a callback function to enable apparatus 100 to report the sensor-dependant information to application 140 on their gathering. Yet in another embodiment, apparatus 100 may continually log the sensor-dependant information onto a buffer or storage (not shown), and application 140 may check the buffer or storage periodically, or on an as needed basis. Yet in another embodiment, application 140 may actively request apparatus 100 to query the status of sensor 116 and/or 126. For example, although there is no angle changing event at a point in time, application 140 may nonetheless query apparatus 100 at that time to obtain the open angle information to determine how a 3D scene should be presented while apparatus 100 is at the current posture characterized by the current open angle between panels 110 and 120.

In embodiments, application 140 may generate responses based at least in part on such inputs. As an example, application 140 may translate the open angle information ht of application related semantics to user commands, and then react to the user's commands with audible, visual, or tactile output. In embodiments, such output may be displayed to user 150 on display device 112 or display device 122, alternatively via other suitable output devices (not shown in FIG. 1).

In various embodiment, the application related semantics may include a state of application 140 (e.g., scenes been displayed, various parameters for a 3D scene, zooming factor, page number, players of a game, past events of the application, and/or predicted future events of the application), a state of the computing device on which application 140 is operating (e.g., power, performance, memory, storage, load, battery state, and/or thermal data), logical environment (e.g., network connectivity, data received over a network), and/or physical environment of the computing device (e.g., is the computing device mobile, at home, at an office, on a car, on a train, on a flight, or in a foreign country), etc. In embodiments, the application related semantics may include other information, both inside and outside application 140 or the computing device hosting application 140.

In embodiments, an operating system (OS) (not shown) may manage computer hardware resources, including sensor 116 and/or sensor 126, and provides common services for applications running in apparatus 100 or another remote computer. An OS may provide sensor-based services, such as one or more methods to interpret sensor-based data in additional to the sensor data, to any application running on that operating system or remotely. Thus any application may take in the sensor data and varies output based on the sensor data.

Figure 2:
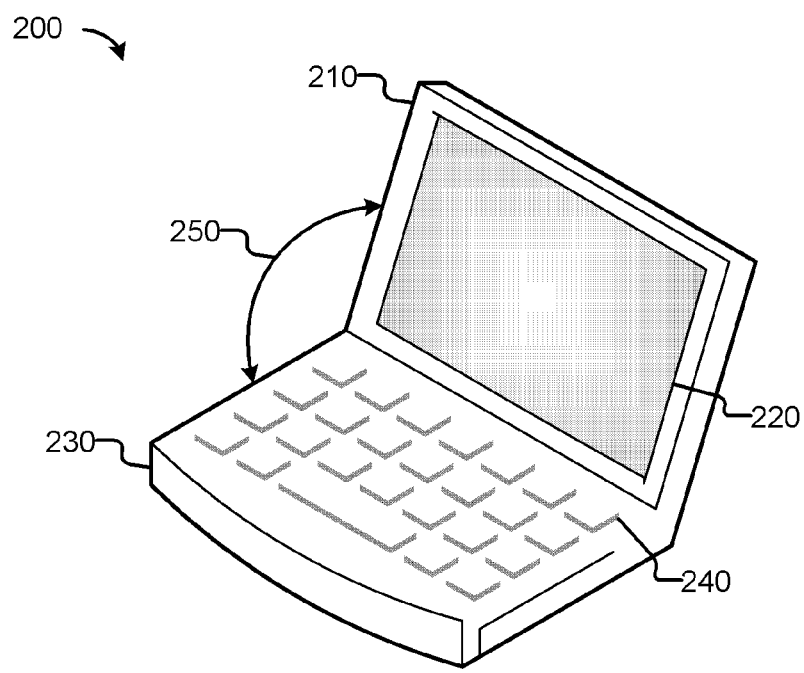
FIG. 2 illustrates a graphical representation of an example apparatus into which aspects of the present disclosure may be incorporated, in accordance with various embodiments.

Referring now to FIG. 2, a graphical representation of an example apparatus 200 is shown in accordance with various embodiments, wherein aspects of the present disclosure may be incorporated. As shown, apparatus 200 may include a first panel 210 housing a display device 220, and a second panel 230 housing a keyboard 240. The first panel 210 may be tilted away from the second panel 230 and forming an open angle 250 between the first panel 210 and the second panel 230. In embodiments, apparatus 200 may be a computing device, such as a notebook computer, subnotebook computer, rugged computer, portable computer, tablet computer, personal digital assistant (PDA), or a special purpose computing device. In case of a tablet, the second panel 230 may be a case, cover, sleeve, and/or keyboard connected to the panel 210. In embodiments, apparatus 200 may be endowed with one or more of the earlier described sensors to provide various information associated with open angle 250, for a hosted application to adapt its outputs based at least in part on the open angle 250 related information, to enrich user experience of the hosted application.

Figure 3:
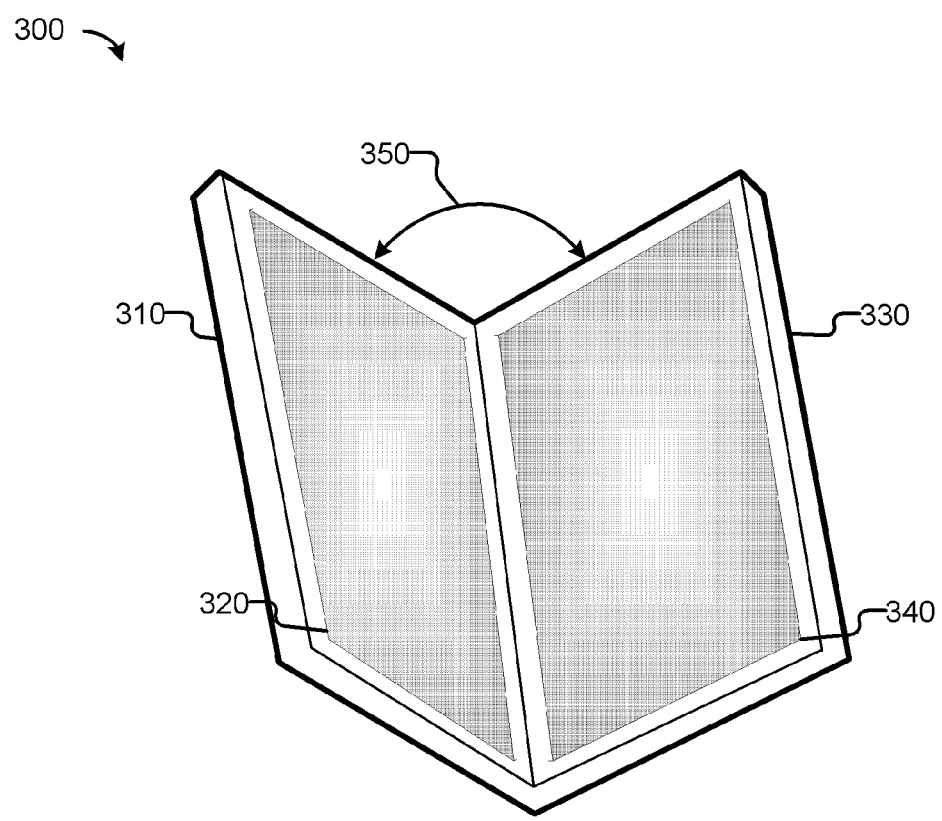
FIG. 3 illustrates a graphical representation of another example apparatus into which aspects of the present disclosure may be incorporated, in accordance with various embodiments.

Referring now to FIG. 3, a graphical representation of another example apparatus 300 is shown, in accordance with various embodiments, wherein aspects of the present disclosure may be incorporated. As shown, apparatus 300 may include a first panel 310 housing a display device 320, and a second panel 330 housing another display device 340. The first panel 310 may be tilted away from the second panel 330 and forming an open angle 350 between the first panel 310 and the second panel 330. Apparatus 300 may be a dual-screen computing device, such as a notebook computer, subnotebook computer, rugged computer, portable computer, tablet computer, personal digital assistant (PDA), or a special purpose computing device. In embodiments, apparatus 300 may be endowed with one or more of the earlier described sensors to provide various information associated with open angle 350, for a hosted application to adapt its outputs based at least in part on the open angle 350 related information, to enrich user experience of the hosted application.

Figure 4:
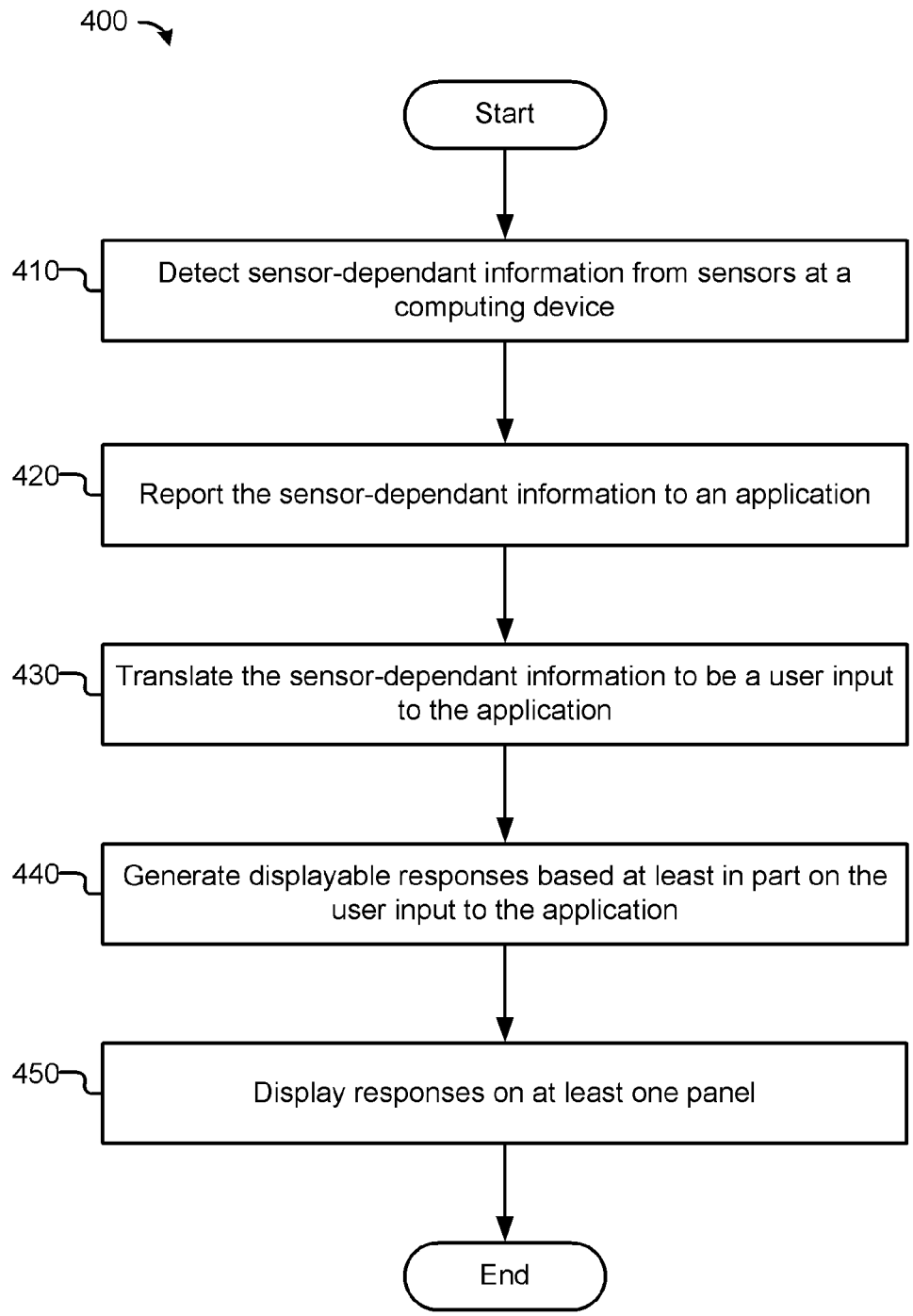
FIG. 4 illustrates an example sensor information utilization process incorporating aspects of the present disclosure, in accordance with various embodiments.

FIG. 4 illustrates an example sensor information utilization process 400, incorporating aspects of the present disclosure, in accordance with various embodiments. In embodiments, the process may begin at block 410, where sensor 116 or 126 may detect sensor-dependant information. Some particular embodiments of the operation(s) of block 410 are disclosed above in connection with angle detection sensor 132, angular velocity detection sensor 134, and motion detection sensor 136. Particular embodiments of the operation(s) of block 410 are described below with reference to process 500 of FIG. 5. Next, at block 420, apparatus 100 may report the sensor-dependant information to application 140. Particular embodiments of the operation(s) of block 420 are described below with reference to process 600 of FIG. 6.

Next, at block 430, the sensor-dependant information may be translated into a user input to application 140. The translation operation(s) of block 430 may be based at least in part on the related semantics of application 140. The translation operation may be carried out by apparatus 100, application 140, or another host computer for application 140. Particular embodiments of the operation(s) of block 430 are described below with reference to process 700 of FIG. 7.

Next, at block 440, application 140 may generate displayable responses, based at least in part on the user input, and such responses may be based at least in part on the related semantics of application 140. Particular embodiments of the operation(s) of block 440 are discussed below. Next, at block 450, the displayable responses generated by application 140 may be displayed on display device 112 or 122. In embodiments, process 400 may then be repeated starting at block 410 for additional operational cycles. In some embodiments, process 400 instead ends.

Figure 5:
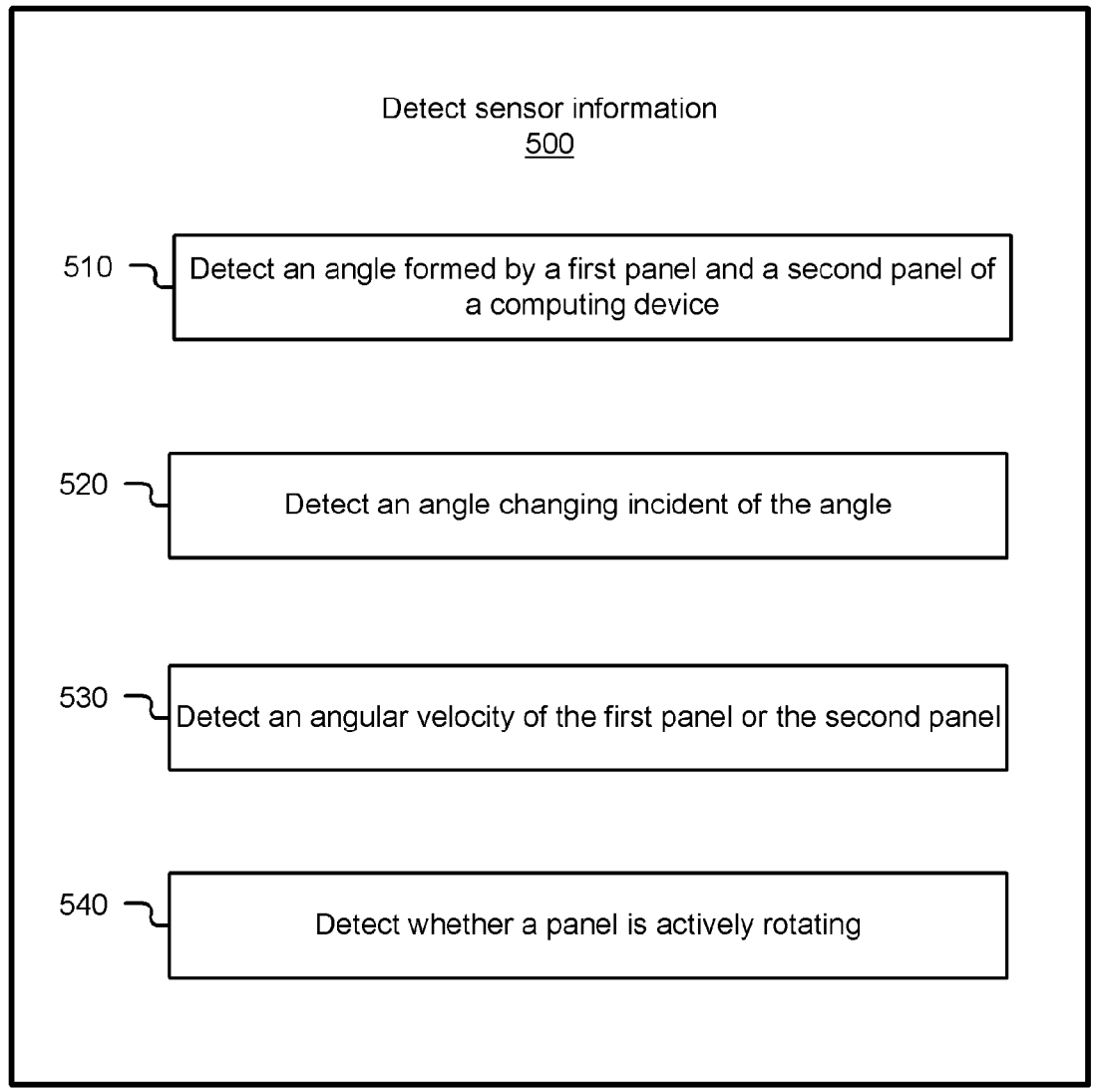
FIG. 5 illustrates an example sensor information detection process incorporating aspects of the present disclosure, in accordance with various embodiments.

FIG. 5 illustrates an example sensor information detection process 500 incorporating aspects of the present disclosure, in accordance with various embodiments. In embodiments as shown, sensor information detection process 500 may be performed by sensor 116 or 126 to implement one or more embodiments of the operation(s) of block 410 of process 400. Process 500 may include block 510, where sensor 116 or 126 may detect a variable angle formed between a first panel and a second panel of a computing device, such as angle 250 or angle 350. Some particular embodiments of the operation(s) of block 510 are disclosed above in connection with the discussion of angle detection sensor 132. In embodiments, the variable angle is only utilized between 20 to 360 degrees because a user may not able to effectively view displayed contents if the open angle is less than 20 degrees. In embodiments, discrete or continuous serial time-encoded angle information may be analyzed together to generate new information, such as the angular velocity of a moving panel or moving patterns of a panel.

Process 500 may also include block 520, where sensor 116 or 126 may detect an angle changing event of the open angle formed between panel 110 and panel 120 of apparatus 100. For example, angle 250 or angle 350 may be enlarged or reduced, and such angle changing event may be detected. Some particular embodiments of the operation(s) of block 520 are also disclosed above in connection with the discussion of angle detection sensor 132. In embodiments, discrete or continuous serial time-encoded angle changing events may be analyzed together to generate new information, such as the use pattern of a user. Moreover, in embodiments, combining information of one or more angle changing events and angles accompanying the one or more angle changing events may reveal more information, such as a user's favorable viewing angle of a particular application.

Process 500 may also include block 530, where sensor 116 or 126 may detect an angular velocity of panel 110 and/or panel 120 of apparatus 100 moving away or towards each other. Some particular embodiments of the operation(s) of block 530 are disclosed above in connection with the discussion of angular velocity detection sensor 134. Moreover, process 500 may include block 540, where sensor 116 and/or 126 may detect whether a panel is actively moving. Some particular embodiments of the operation(s) of block 540 are disclosed above in connection with the discussion of motion detection sensor 136. In various embodiments, process 500 may further include additional detecting operations for gathering other types of sensor information.

Figure 6:
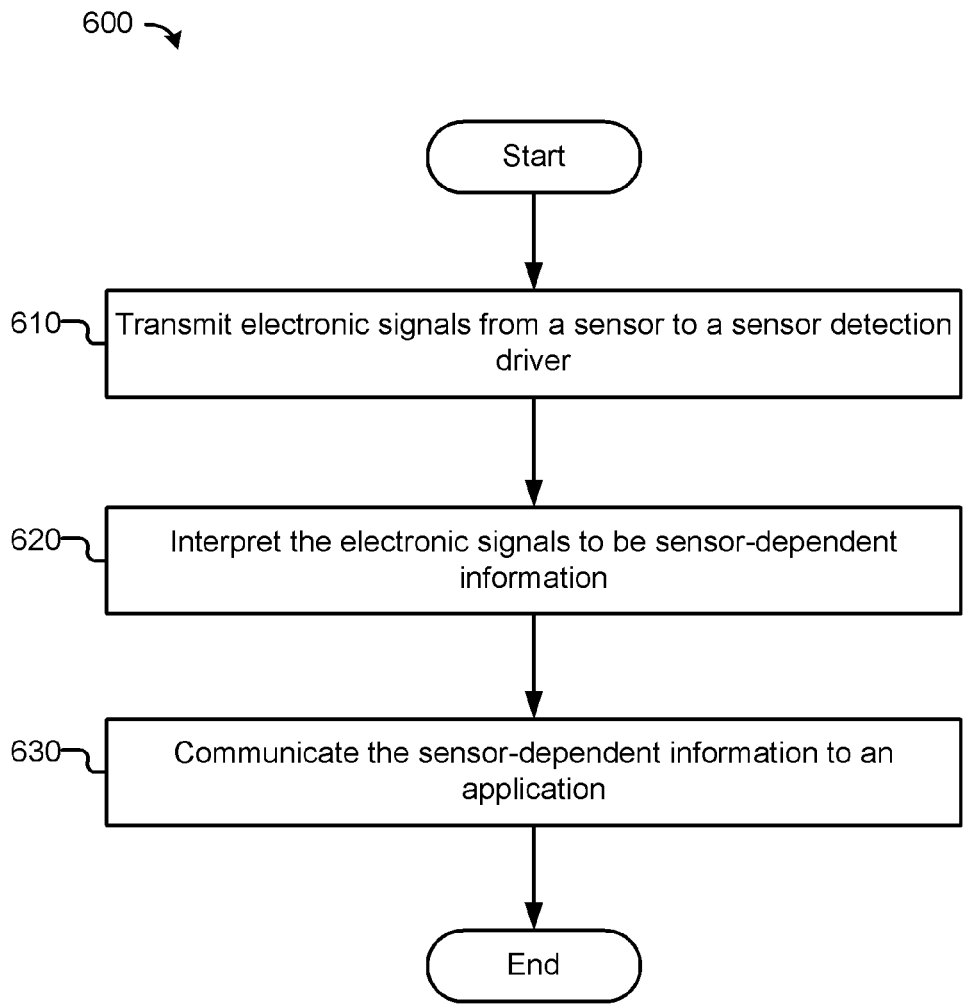
FIG. 6 illustrates an example sensor information reporting process incorporating aspects of the present disclosure, in accordance with various embodiments.

FIG. 6 illustrates an example sensor information reporting process 600 incorporating aspects of the present disclosure, in accordance with various embodiments. As shown, process 600 may be performed by a component internal to apparatus 100 and/or a component external to apparatus 100 to implement one or more embodiments of the operation(s) of block 420 of process 400 depending on the hosting environment of application 140.

The process may begin at block 610, where the electronic signals from sensor 116 or 126 may be transmitted from the sensor to a sensor detection driver. In embodiments, the sensor detection driver may be an internal component of apparatus 100, such as a software program acting as a liaison between higher-level computer programs to interact with sensor 116 or 126 via a computer bus or communications subsystem.

Next, at block 620, the electronic signals may be interpreted to become sensor-dependent information. For example, the voltage or the change of voltage caused by a piezoelectric accelerometer may correspond to a particular angle in the case of an angle detection sensor, a particular angular velocity in the case of an angular velocity detection sensor, or an indication of an actively moving panel in the case of a motion detection sensor.

Next, at block 630, the so interpreted sensor-dependent information may be communicated to application 140. In embodiments, the communication may be accomplished via direct internal communication via a bus or networking activities which may span from LAN, WAN, or Internet. In some embodiments, process 600 may then be repeated starting at block 610 for additional operational cycles. In some embodiments, process 600 may instead end.

Figure 7:
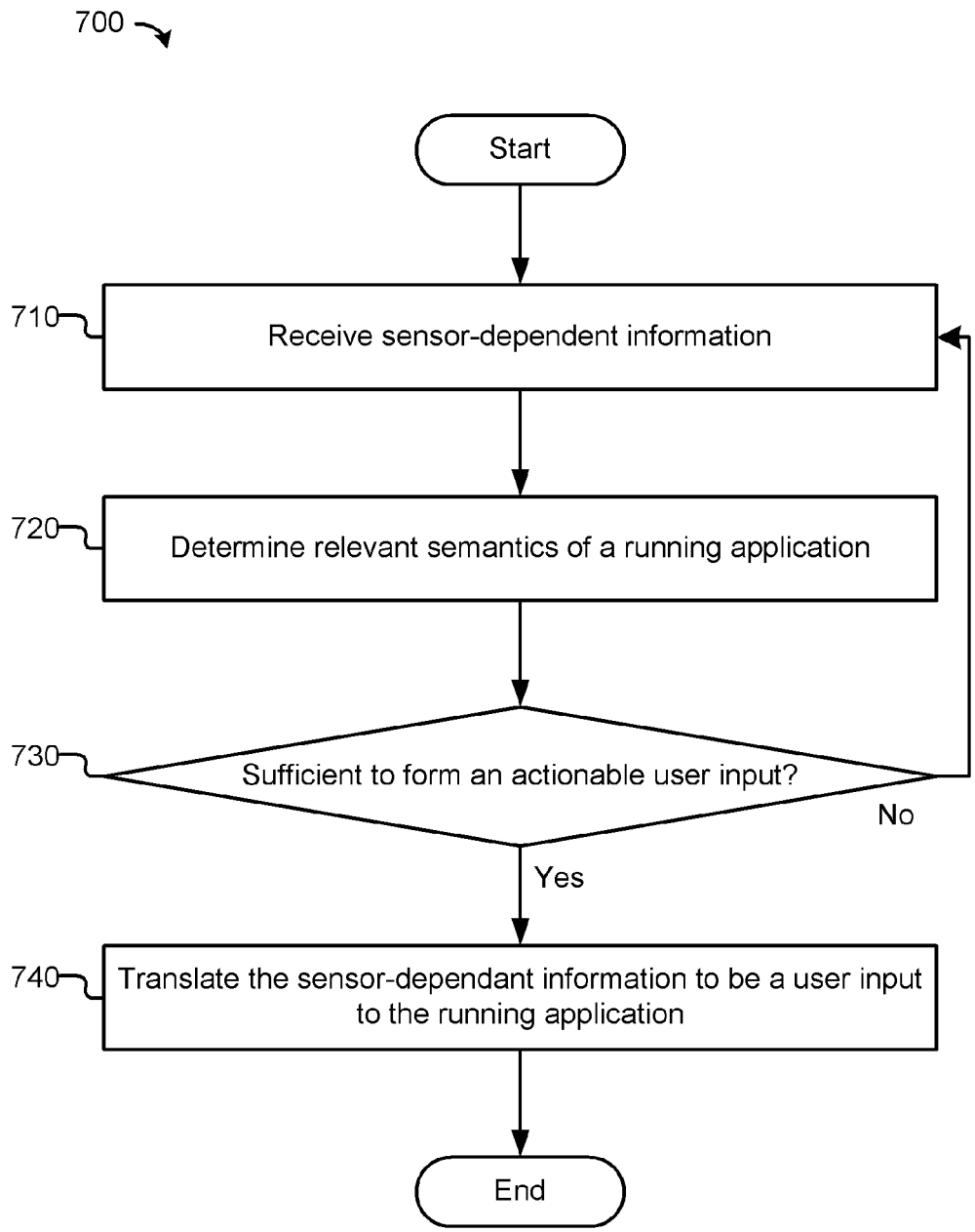
FIG. 7 illustrates an example sensor information translation process incorporating aspects of the present disclosure, in accordance with various embodiments.

Referring now to FIG. 7, that figure illustrates an example sensor information translation process 700 incorporating aspects of the present disclosure, in accordance with various embodiments. The process may begin at block 710, where application 140 may receive sensor-dependent information in connection with process 600. In embodiments, the sensor-dependant information may be received passively by application 140. In other embodiments, application 140 may be configured to actively request and/or otherwise obtain the sensor-dependant information from apparatus 100.

Next, at block 720, relevant semantics of a running application is to be determined. In general, any information may affect an application's response to a user input are relevant semantics of the application. In embodiments, the application related semantics may include a state of the application, a state of the hosting computing device, logical environment of the hosting computing device, and/or physical location of the hosting computing device, etc.

With relevant semantics of a running application, a decision may be made at decision block 730 regarding whether to translate sensor-dependent information to an actionable user input or command to the application. For example, it may be determined that an angle changing event is merely caused by the vibration of the environment which may be typical in a moving vehicle, thus such sensor-dependent information does not warrant a response from the application. In another example, it may be determined that angle 350 is too small to be eligible for receiving any response from the application if angle 350 falls below a predetermined threshold value.

At decision block 730, if it is determined that sensor-dependent information is insufficient to be translated into an actionable user input in light of the relevant semantics of the running application, then process 700 may continue to wait for receiving additional sensor-dependent information at block 710. Otherwise, process 700 may enter operation 740, where sensor-dependent information may be translated into an actionable user input to a running application in light of the relevant semantics of the running application. Thereafter, process may end. Particular embodiments of the operation(s) of block 740 are described below.

Figure 8:
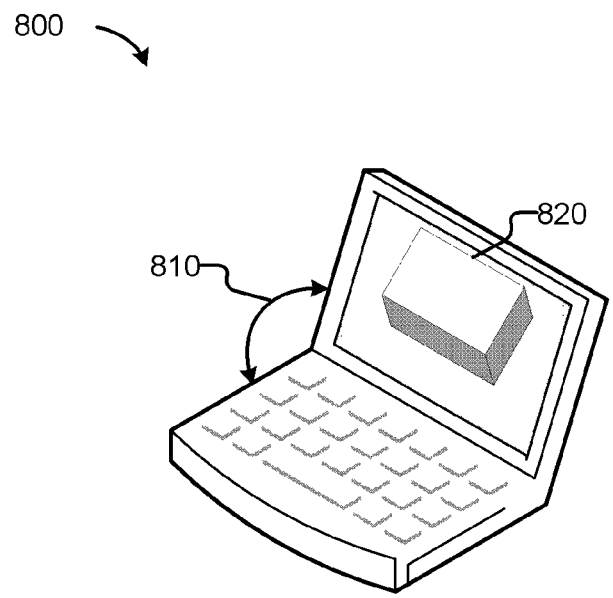
FIG. 8 illustrates an example response of an application, incorporating aspects of the present disclosure, in accordance with various embodiments.
Figure 8:
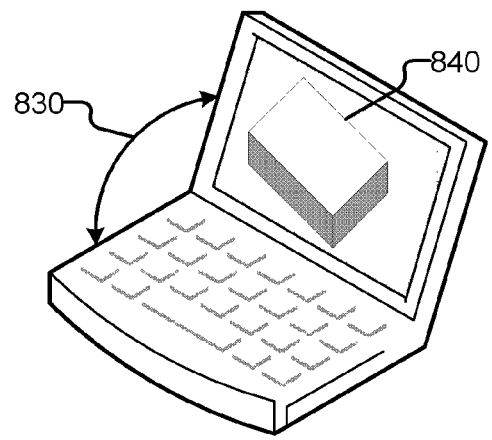

FIG. 8 illustrates an example response of an application, incorporating aspects of the present disclosure, in accordance with various embodiments. As illustrated, a 3D view 820 is displayed by apparatus 800, while apparatus 800 is in a posture characterized by open angle 810. As open angle 810 changes, e.g., to open angle 830, in various embodiments, one type of response is to change 3D view 820 to 3D view 840. In some embodiments, the underlying application may use a viewing reference coordinate (VRC) system as a reference for specifying the observer viewing position and the position of the view plane or projection plane. In embodiments, changing open angle 810 between two panels of apparatus 800 to open angle 830 may cause a 3D application to change the view plane normal (VPN) vector in a 3D VRC, thus the look-at point relative to the origin of our viewing coordinate system or so called the view reference point (VRP). In other embodiments, changing open angle 810 to open angle 830 may cause a 3D application to change the view-up vector (VUP) in the VRC, thus the orientation of the view plane. Yet in other embodiments, changing the open angle may cause a 3D application to change the center of window (CW) on the view plane, thus moving the region of the view plane to be viewed. Yet in other embodiments, changing open angle 810 to open angle 830 may cause a 3D application to even change to a new VRP, and then fundamentally change a 3D view which can be observed by a 3D viewer. Yet in other embodiments, changing open angle 810 to open angle 830 may cause a 3D application to change other parameters of a 3D view.

In various embodiments, another type of response of an application is generating 3D inputs based at least in part on open angle 810. For example, the 3D view 820 may be a scene in the well-known Angry Birds® game. In this embodiment, when a player pulls a bungee cord, the change of open angle 810 to open angle 830 may update the launching angle. In embodiments, other inputs from input device 114, such as a keystroke, may be coordinated with the open angle information in generating 3D inputs. Using the same example in the Angry Birds® game, a shift key may be used in concert with the changing of open angle 810 to open angle 830 to dynamically manipulate the trajectory of a flying bird.

Figure 9:
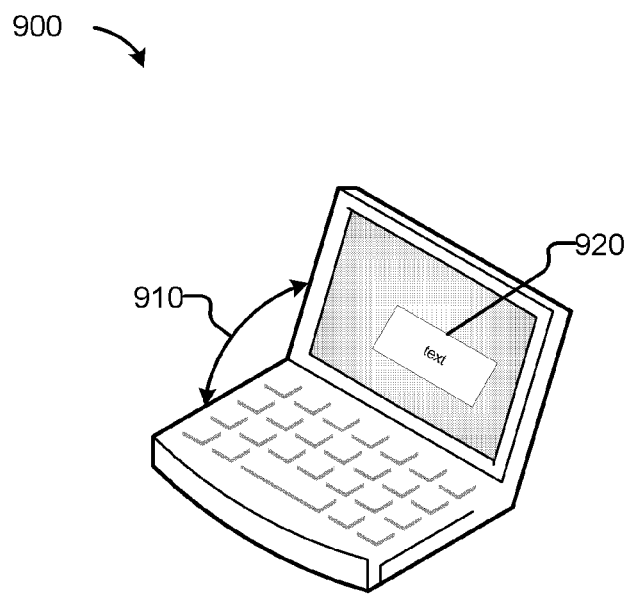
FIG. 9 illustrates another example response of an application, incorporating as of the present disclosure, in accordance with various embodiments.
Figure 9:
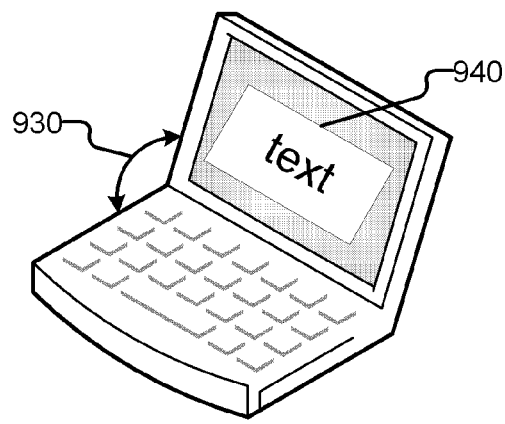

FIG. 9 illustrates another example response of an application, incorporating aspects of the present disclosure, in accordance with various embodiments. A 2D view 920 may be displayed by apparatus 900 while apparatus 900 is in a posture characterized by the open angle 910. In embodiments, one type of response of the application is to change the views between 2D view 920 and 940. In embodiments, a user can increase open angle 910 to open angle 930 by pushing the screen away thus to zoom out at the 2D view, or decrease open angle 930 to open angle 910 by pulling the screen closer thus to zoom in at the 2D view. In one embodiment, suppose open angle 910 is a degrees with a corresponding zoom factor of $\beta$; when the open angle 930 decreased to be $(\alpha-x)$ degrees, the zoom factor may be changed to $(\beta+\theta x)$ where $\theta$ is an application-dependant parameter. In other embodiments, open angle 910 and 930 may correlate with the zoom factor or other parameters of an application in various relationships.

Figure 10:
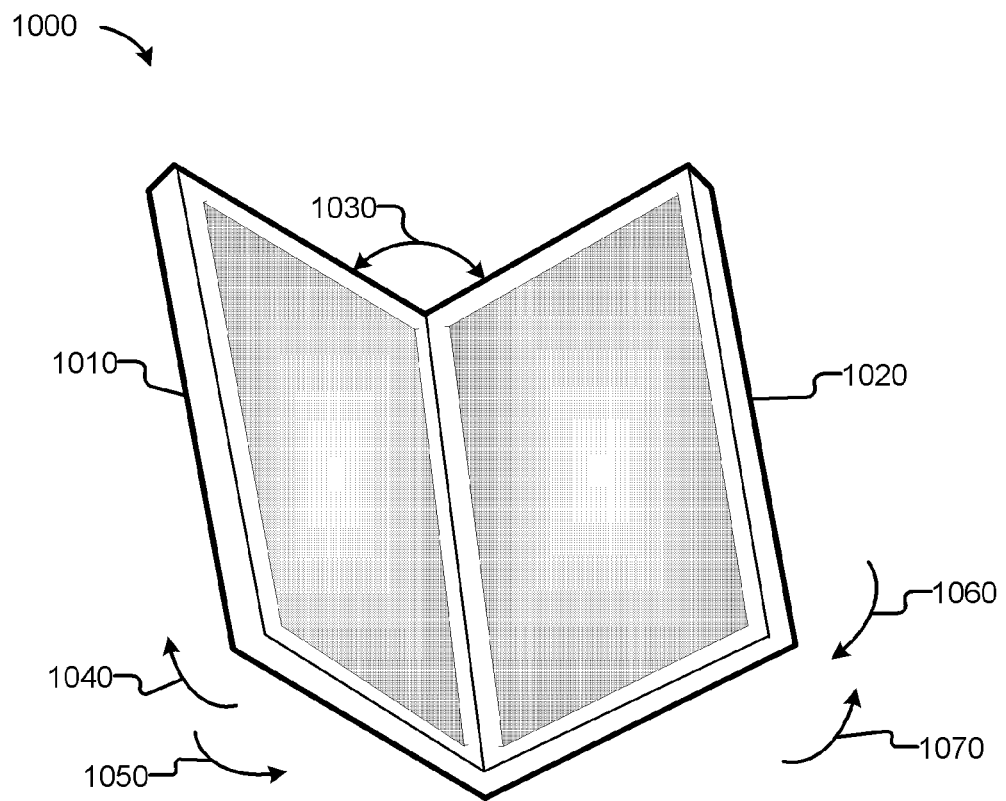
FIG. 10 illustrates an example process for generating user inputs, incorporating aspects of the present disclosure, in accordance with various embodiments.

Referring now to FIG. 10, that figure illustrates an example process for generating user inputs, incorporating aspects of the present disclosure, in accordance with various embodiments. In FIG. 10, a dual display apparatus 1000 may be configured to include a first panel 1010 and a second panel 1020 capable of forming an open angle 1030. In embodiments, dual display apparatus 1000 may further be configured to detect and report a user shaking one of the panels 1010 or 1020 to generate user inputs for an application to respond by turning pages forward or backward. A page may be a web page, a book page, a photo in photography galleries, etc. In one embodiment, dual display apparatus 1000 may be configured to detect and report a user pulling panel 1020 forward first with the forward motion 1060 then pushing it back with the backward motion 1070 to an application. The application may then respond by turning one page forward. In another embodiment, dual display apparatus 1000 may be further configured to detect and report a use pushing panel 1020 backward first with the backward motion 1070 then pulling it with the forward motion 1060 to an application. The application may then respond by turning one page backward. Further, dual display apparatus 1000 may be configured to detect and report similar user inputs for pulling motion 1050 and pushing motion 1040 applied on panel 1010. Yet in another embodiment, dual display apparatus 1000 may be configured to detect and report a user repeatedly shaking a panel to an application. The application may in turn respond by turning multiple pages. In embodiments, dual display apparatus 1000 may be configured to detect and report user inputs generated based on movement of panel 1010, independent of user inputs generated based on movement of panel 1020. In other embodiments, dual display apparatus 1000 may be configured to detect and report user inputs based on movements of panel 1010 in concert with detection and reporting of user inputs based on panel 1020 to accomplish an application dependant function or task.

In embodiments, selected one or more sensors from angle detection sensor 132, angular velocity detection sensor 134, and motion detection sensor 136 may be provided to dual display apparatus 1000 to detect and report the user inputs. In one embodiment, application 140 may receive sequentially reported angle information from angle detection sensor 132, e.g., the fact that open angle 1030 decreased then increased within a predetermined time window. Simultaneously, motion detection sensor 136 may report that panel 1020 is actively rotating while panel 1010 remains still. In this case, application 140 may reach a conclusion that panel 1020 has been shaken by a forward motion 1060 followed by a backward motion 1070. The application may then infer a user input based on the conclusion.

In another embodiment, application 140 may similarly receive sequentially reported angle information from angle detection sensor 132, e.g., the fact that open angle 1030 decreased then increased within a predetermined time window. Meanwhile, angular velocity detection sensor 134 may report that the angular velocity of panel 1020 is significantly greater than the angular velocity of panel 1010. In this case, application 140 may similarly reach a conclusion that panel 1020 has been shaken by a forward motion 1060 followed by a backward motion 1070. Likewise, the application may then infer another user input based on this conclusion.

Yet in another embodiment, application 140 may receive sequentially reported angle information from angle detection sensor 132, e.g., the fact that the cycle of open angle 1030 being decreased then increased has been repeated within a predetermined time window. Meanwhile, angular velocity detection sensor 134 may report the angular velocity of panel 1010 and panel 1020 corresponding to those cycles. In this case, application 140 may determine a speed for turning multiple pages based on the angular velocity of panel 1010 and/or panel 1020.

Yet in another embodiment, application 140 may receive sequentially reported angle information from angle detection sensor 132, e.g., the fact that open angle 1030 decreased or increased slowly but continuously within a predetermined angle range, such as from 20 to 180 degrees. In this case, the application may infer a user input for automatically flipping through a plurality of pages with a selected speed. Thus an exploration experience may be provided to a user similar to readers flipping through a book in a bookstore.

In other embodiments, application 140 may reach different conclusions based on different sensor information patterns.

Figure 11:
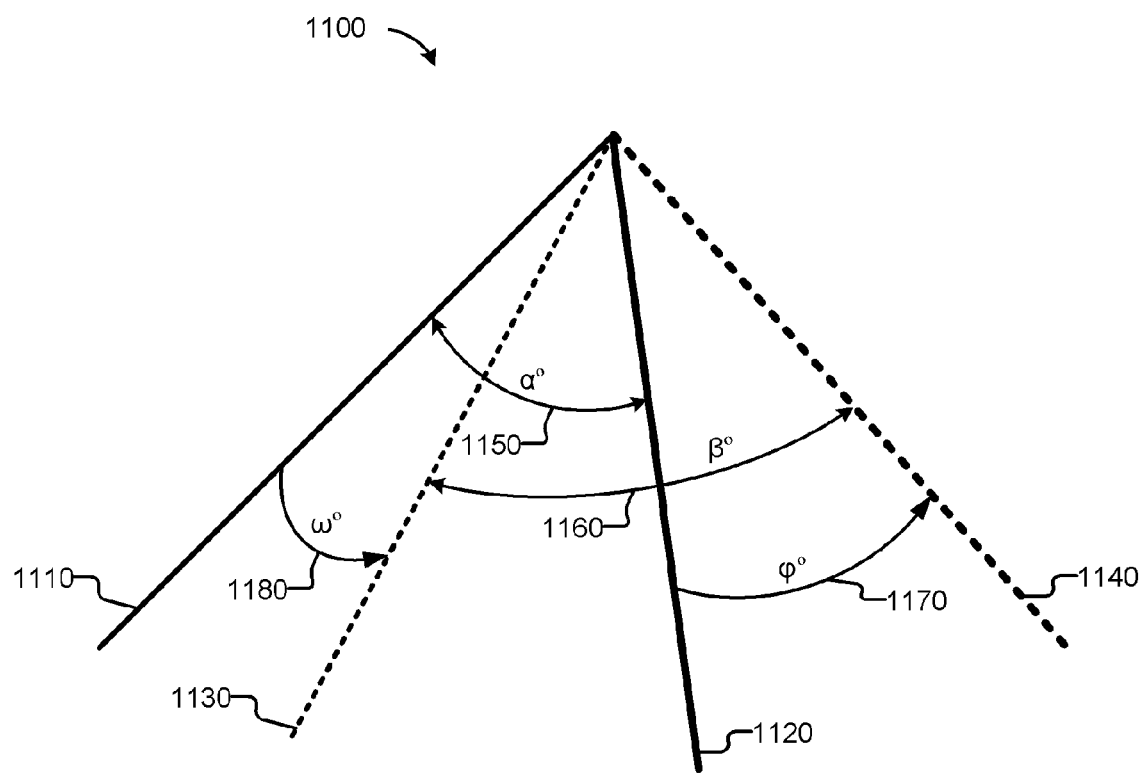
FIG. 11 illustrates an example process for detecting an actively moving panel, incorporating aspects of the present disclosure, in accordance with various embodiments.

FIG. 11 illustrates an example process for detecting an actively moving panel, incorporating aspects of the present disclosure in accordance with various embodiments. In embodiments as illustrated, angle detection sensor 132 and angular velocity detection sensor 134 may be utilized together to detect whether panel 1110 or panel 1120 is actively moving, thus changing the spatial relationship between the two panels. Angular velocity detection sensor 134 may be attached with either panel 1110 or panel 1120. Angular velocity detection sensor 134 may detect the angular velocity of either panel 1110 or panel 1120. The rotated angle of either panel 1110 or panel 1120 may be calculated via integration of respective angular velocity. Angle detection sensor 132 may report the initial open angle 1150 ($\alpha$) between panel 1110 and 1120 in their respective initial positions and the after rotation open angle 1160 ($\beta°$) in their respective after rotation positions 1130 and 1140. The rotating angle 1170 ($\phi$) of panel 1120 may be determined based on the angular velocity information of panel 1120.

In this process, any panel may have actively moved; by the same token, it is also possible that no panel has actively moved. However, based on known information about angles 1150 ($\alpha$), 1160 ($\beta$), and 1170 ($\phi$), a system service or an application of a display apparatus may determine which panel is the actively moving panel if there is any. In one embodiment, the rotating angle 1180 ($\omega$) of panel 1110 should presumably be equals to ($\alpha+\phi-\beta$) as shown in the figure. The active rotating panel may be determined from angle information of 1170 ($\phi$) and 1180 ($\omega$) thereafter. For example, if angle 1180 ($\omega$) is close to zero, and angle 1170 ($\phi$) is much greater than zero, then it may be concluded that panel 1120 is the active rotating panel because the open angle increased but panel 1110 substantially remained still. As another example, if angle 1170 ($\phi$) is close to zero, and angle 1180 ($\omega$) is much greater than zero, then it may be concluded that panel 1110 is the active rotating panel because the open angle increased but panel 1120 substantially remained still. Yet as another example, if angle 1170 ($\phi$) and angle 1180 ($\omega$) are substantially close, then it may be concluded that apparatus 1100 rotated as a whole and neither panel 1110 nor panel 1120 is actively rotating. In this embodiment, one angular velocity detection sensor and one angle detection sensor may be sufficient to calculate angle 1170 ($\phi$) and angle 1180 ($\omega$) as disclosed above. In another embodiment, respective angular velocity detection sensor may be attached to both panels to calculate angle 1170 ($\phi$) and angle 1180 ($\omega$) independently. In other embodiments, the actively moving panel may be determined using analogous logical deductions in various scenarios.

Figure 12:
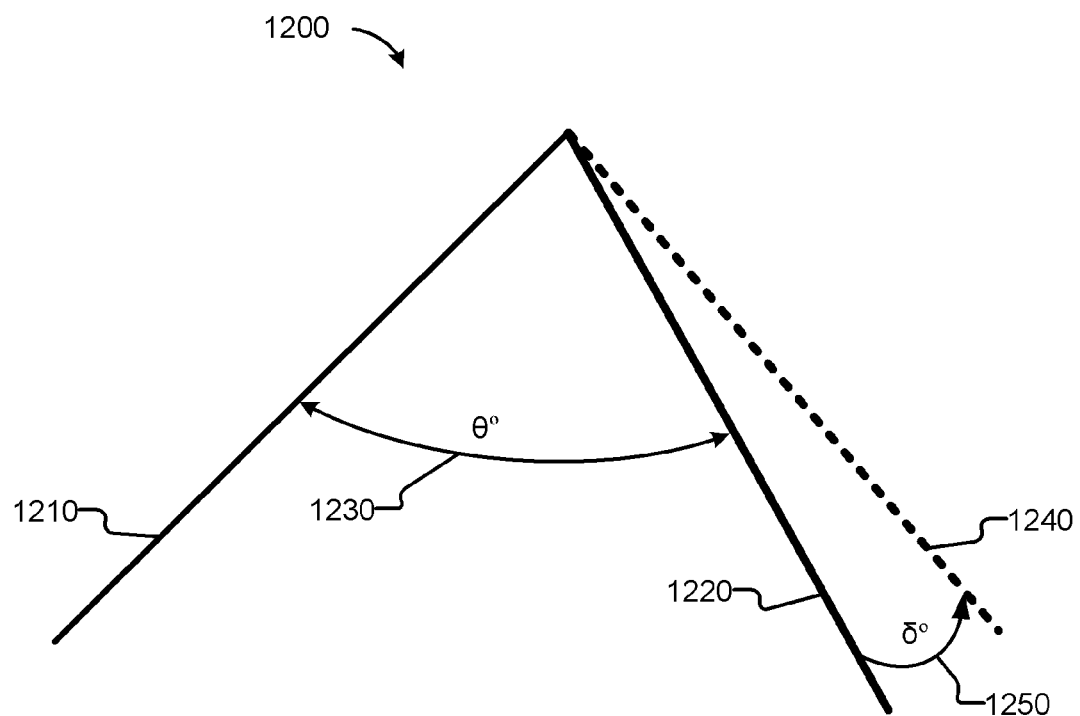
FIG. 12 illustrates another example process for generating user inputs, incorporating aspects of the present disclosure, in accordance with various embodiments.

FIG. 12 illustrates another example process for generating user inputs with apparatus 1200, incorporating aspects of the present disclosure in accordance with various embodiments. In embodiments as illustrated, the rotating degree of a panel may be used to provide a user input to algorithmically determine a particular point in a linear structure to display, such as a web page among a sequence of web pages, a book page among a book, a photo in photography galleries, etc. As the figure shows, panel 1210 and panel 1220 may be arranged to form an open angle 1230 ($\theta$). As an example, a book may have a page number range from 0 to N, and suppose the current page number on panel 1210 is X, and the current page number on panel 1220 is Y. Further suppose panel 1220 rotated $\delta°$ to a new position 1240, and panel 1210 substantially remains still. In embodiments, the underlying application may use angle 1250 ($\delta'$) as a user input to algorithmically determine which page should be displayed on panel 1220 after rotation. In one embodiment, the page displayed on panel may be updated to be the page number of $(Y+\delta*(N-Y)/(180-\theta))$ after proportionally correlating angle 1250 ($\delta°$) with remaining pages in the hook. In this case, a user may gain the experience to jump to a random page roughly based on whereabouts of the page in the book. In other embodiments, the page displayed on panel may be updated based on other suitable formulas.

Figure 13:
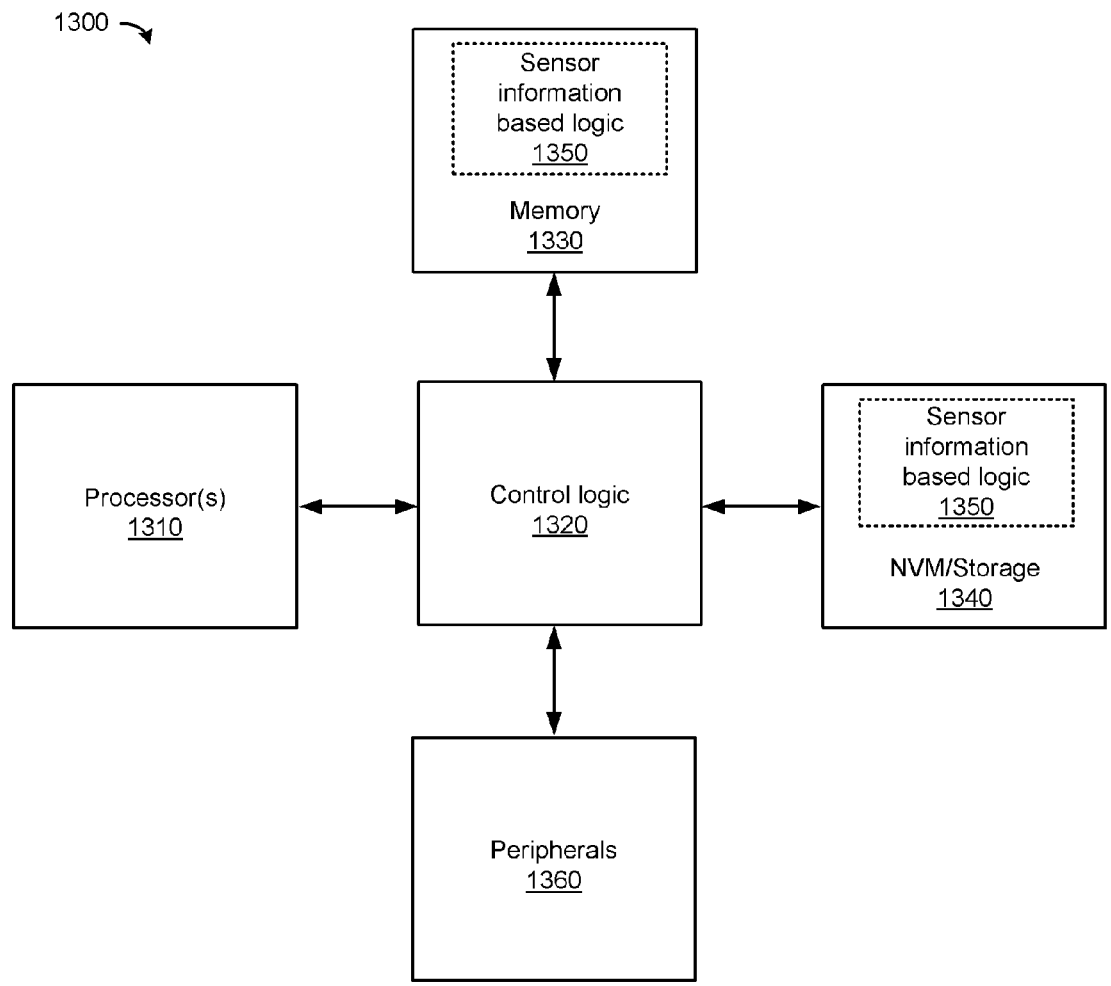
FIG. 13 illustrates an example computing environment into which aspects of the present disclosure may be incorporated, in accordance with various embodiments.

FIG. 13 illustrates an example computing environment 1300 into which aspects of the present disclosure may be incorporated in accordance with various embodiments. As illustrated, example computer system 1300 may include control logic 1320 coupled to at least one of the processor(s) 1310, memory 1330 coupled to control logic 1320, non-volatile memory (NVM)/storage 1340 coupled to control logic 1320, and one or more peripherals 1360 coupled to control logic 1320. In embodiments, each of the one or more processors 1310 may be include one or more processor cores. In embodiments, peripherals 1360 may include earlier described sensors 116 or 126, e.g., angle detection sensor 132, angular velocity detection sensor 134, and/or motion detection sensor 136. In embodiments, peripherals 1360 may also include one or more communications interfaces.

In one embodiment, control logic 1320 may include any suitable interface controllers to provide for any suitable interface to at least one of the processor(s) 1310 and/or to any suitable device or component in communication with control logic 1320. In another embodiment, control logic 1320 may include one or more input/output (I/O) controller(s) to provide an interface to NVM/storage 1340 and peripherals 1360. Yet in another embodiment, control logic 1320 may include one or more memory controller(s) to provide an interface to memory 1330. Memory 1330 may be used to load and store data and/or instructions, for example, for system 1300. In one embodiment, memory 1330 may include any suitable volatile memory, such as suitable dynamic random access memory (DRAM), for example.

NVM/storage 1340 may be used to store data and/or instructions, for example. NVM/storage 1340 may include any suitable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s), for example.

NVM/storage 1340 may include a storage resource physically part of a device on which the system 1300 is installed or it may be accessible by, but not necessarily a part of, the device. For example, the NVM/storage 1340 may be accessed over a network via peripherals 1360.

Memory 1330 and NVM/storage 1340 may include, in particular, temporal and persistent copies of sensor information based logic 1350, e.g., device drivers of the various sensors. The sensor information based logic 1350 may include instructions that when executed by at least one of the processor(s) 1310 result in the system 1300 practicing one or more of the sensor information based processes described above. In some embodiments, the sensor information based logic 1350 may additionally/alternatively be located in the control logic 1360.

Communications interface(s) of peripherals 1360 may provide an interface for system 1300 to communicate over one or more network(s) and/or with any other suitable device. Communications interface(s) may include any suitable hardware and/or firmware, such as a network adapter, one or more antennas, a wireless interface, and so forth. In embodiments, communication interface(s) may include an interface for system 1300 to be coupled to a wired or wireless, public and/or private, local and/or wide area networks. In embodiments, communication interface(s) may include an interface for system 1300 to use NFC, optical communications (e.g., barcodes), Bluetooth or other similar technologies to communicate directly (e.g., without an intermediary) with another device.

For one embodiment, at least one of the processor(s) 1310 may be packaged together with control logic 1320 and/or sensor information based logic 1350. For one embodiment, at least one of the processor(s) 1310 may be packaged together with control logic 1320 and/or sensor information based logic 1350 to form a System in Package (SiP). For one embodiment, at least one of the processor(s) 1310 may be integrated on the same die with control logic 1320 and/or sensor information based logic 1350. For one embodiment, at least one of the processor(s) 1310 may be integrated on the same die with control logic 1320 and/or sensor information based logic 1350 to form a System on Chip (SoC).

Computer-readable media (including non-transitory computer-readable media), methods, systems and devices for performing the above-described techniques are illustrative examples of embodiments disclosed herein. In embodiments, the systems/devices may be any number of personal digital assistants (PDA), smartphones, computer tablets, ebooks, ultrabooks, laptop computers, desktop computers, servers, set-top boxes, or game consoles. Additionally, other devices in the above-described interactions may be configured to perform various disclosed techniques. Thus, open angle detection and processing related apparatuses and methods have been described. In embodiments, an apparatus may include a first panel having a display; and a second panel movably coupled with the first panel. The first panel and second panel may variably define an angle between the two panels. The apparatus may further include one or more sensors disposed in at least one of the first panel or the second panel, and configured to sense a metric indicative of an angle change event of the variable angle between the first panel and the second panel, and output the metric for use by an application to vary output of the application onto the display.

In embodiments, the one or more sensors may include an angle detection sensor configured to detect an angle of the variable angle between the first panel and the second panel. The one or more sensors may include a motion detection sensor configured to detect whether a panel is actively rotating. The one or more sensors may include an angular velocity detection sensor configured to detect an angular velocity of a moving panel of the first panel or the second panel.

In embodiments, the second panel may include a second display. The second panel may be detachable from the first panel. In embodiments, the variable angle may be between 20 to 360 degrees, in embodiments, the application may be configured to run remotely from the apparatus.

In embodiments, the apparatus may be a computing device. The computing device may be a selected one of a mobile phone, a smartphone, a slate tablet, a convertible tablet, a booklet, a hybrid tablet, a mini tablet, an ultrabook, a wearable computer, a personal digital assistant, a portable media player, a portable game player, a notebook computer, a desktop computer, a set-top box, a game console, or a server.

In embodiments, a method may include detecting, by a computing device, an angle changing event of an angle defined by a first panel and a second panel of a computing device. The first panel may include a display, and the second panel may be movably coupled with the first panel. The method may further includes translating, by the computing device, the angle changing event to a user input; and communicating, by the computing device, the user input to an application to enable the application to vary output of the application onto the display.

In embodiments, the method may further include detecting, by the computing device, an angular velocity of the first panel or the second panel. Translating may include translating the angular velocity and the angle change event in combination into the user input. The method may further include detecting, by the computing device, a motion relating to an actively rotating panel of the first panel or the second panel. Translating may include translating the motion and the angle change event in combination into the user input. Detecting a motion may include detecting a change of spatial relationship between the first panel and the second panel. Detecting an angle changing event may include detecting variance of the angle in a range of 20 to 360 degrees. Detecting may include receiving, by a device driver of the computing device, electronic signals outputted by one or more sensors of the computing device; and outputting, by the device driver, the angle changing event based at least in part on the electronic signals. Communicating to an application may include communicating to an application located at another computing device.

In embodiments, the method may further include interpreting the user input, by the application, in accordance with semantics of the application. Interpreting may include interpreting the user input as a selected one of a changing 2D view command, a 2D input, a changing 3D view command, a 3D input, a zooming control command, or a page turning command.

In embodiments, the method may further include generating, by the application, one or more displayable responses on at least one of the first panel and the second panel based at least in part on the user input. Generating one or more displayable responses may include changing a view on at least one of the first panel and the second panel. Changing a view may comprise changing a 3D view.

Moreover, embodiments may include one or more machine readable storage medium which has a number of instructions configured to enable a controller of a computing device, in response to execution of the instructions by the controller, to detect an angle change event of an angle defined by a first panel and a second panel of the computing device. The first panel may include a display, and the second panel may be movably coupled with the first panel. The controller may further translate the angle change event to be a user input to an application for use by the application to vary output of the application onto the display, based at least in part on the user input.

In embodiments, the instructions may be further configured to enable the controller, in response to execution of the instructions by the controller, to detect an angular velocity of at least one of the first panel and the second panel; and translate the angular velocity and the angle change event in combination into the user input.

In embodiments, the instructions may be further configured to enable the controller, in response to execution of the instructions by the controller, to detect a motion relating to an actively rotating panel of the first panel or the second panel, and translate the motion and the angle change event in combination into the user input.

Furthermore, embodiments may include one or more machine readable storage medium which has a number of instructions configured to enable a computing device, in response to execution of the instructions by a processor of the computing device, to provide an application to a user of the computing device. The application may be enabled to receive a notification of an angle change event of an angle formed at least in part by a panel of the computing device, as a user input to the application; and vary output of the application onto a display of the computing device, based at least in part on the user input.

In embodiments, varying output of the application onto a display may include a selected one of varying a 2D view, a 3D view, a zoom factor, a page being displayed, a page turning factor, a 2D input, or a 3D input. Varying the 3D view may include a selected one of changing a view plane normal, a view-up vector, a center of window on a view plane, or a view reference point.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus, comprising:
a first panel having a first display;
a second panel having a second display and being movably coupled with the first panel, wherein the first panel and second panel variably define an angle between the two panels; and
a plurality of sensors disposed in at least one of the first panel and the second panel, wherein the sensors include at least an angle detection sensor, an angular velocity detection sensor, and a motion detection sensor, to: measure an open angle between the first and second panels using the angle detection sensor; detect an angle changing event of the open angle formed between the first and second panels using the angle detection sensor; measure an angular velocity of a moving panel of at least one of the first panel and the second panel using the angular velocity detection sensor; and detect whether the moving panel is actively rotating using the motion detection sensor;
wherein the measured open angle, the angle changing event, the angular velocity, and the active rotation detection are provided to an application; and
wherein the application uses the measured open angle, the angle changing event, the angular velocity, the active rotation detection and semantics information associated with the application, to determine a user input to the application, generate a displayable response based at least in part on the determined user input to the application, and display the response on at least one of the first display and the second display.

2. The apparatus according to claim 1, wherein the second panel is detachable from the first panel.

3. The apparatus according to claim 1, wherein the open angle is between 20 to 360 degrees.

4. The apparatus according to claim 1, wherein the application is to run remotely from the apparatus.

5. The apparatus according to claim 1, wherein the apparatus is a computing device.

6. The apparatus according to claim 5, wherein the computing device is a selected one of a mobile phone, a smartphone, a slate tablet, a convertible tablet, a booklet, a hybrid tablet, a mini tablet, an ultrabook, a wearable computer, a personal digital assistant, a portable media player, a portable game player, a notebook computer, a desktop computer, a set-top box, a game console, or a server.

7. One or more non-transitory machine readable storage medium having a plurality of instructions configured to enable a controller of a computing device that includes a first panel having a first display, and a second panel having a second display and the second panel being movably coupled with the first panel, in response to execution of the plurality of instructions by the controller, to:

detect an angle change event of an angle defined by the first panel and the second panel of the computing device using an angle detection sensor of a plurality of sensors associated with the computing device;

measure an angular velocity of the first or second panel during the angle change event using an angular velocity sensor of the plurality of sensors;

determine whether one of the first panel and the second panel is an actively moving panel that changes spatial relationship between the first and second panels based on respective angular velocities of the first and second panels and respective angles that the first and second panels move from respective initial positions, wherein to determine includes to: determine an open angle between the first and second panels in their respective initial positions using the angle detection sensor; determine an open angle between the first and second panels following rotation of at least one of the first panel and the second panel from the respective initial positions to respective final positions using the angle detection sensor; determine respective rotating angles between the respective initial positions and the respective final positions of both of the first panel and the second panel using the measured angular velocity of the first or second panel, the open angle between the first and second panels in their respective initial positions, and the open angle between the first and second panels following the rotation of the at least one of the first panel and the second panel; and determine which of the first panel and the second panel is an actively moving panel based on values of the determined respective rotating angles; and determine, using the angle change event, the angular velocity of the first or second panel, the determined actively moving panel, and semantics information, a user input to an application to enable the application to:

vary output of the computing device onto the first display or the second display;

generate a displayable response based at least in part on the user input to the application; and display the response on at least one of the first display or the second display.

8. The one or more non-transitory machine readable storage medium according to claim 7, wherein the plurality of instructions are further configured to enable the controller to:

vary output of the application onto a display of the computing device, based at least in part on the user input as a 3D input.

9. The one or more non-transitory machine readable storage medium according to claim 7, wherein to vary output of the application includes a selected one of vary a 2D view, a 3D view, a zoom factor, a page being displayed, or a page turning factor.

10. The one or more non-transitory machine readable storage medium according to claim 7, wherein the plurality of instructions are further configured to enable the controller to:

use the user input to algorithmically determine a particular point in a linear structure of the application to be output onto the display.

11. The one or more non-transitory machine readable storage medium according to claim 7, wherein the plurality of instructions are further configured to enable the controller, in response to execution of the plurality of instructions by the controller, to:

detect a shaking event of the first or second panel; and
translate the shaking event into another user input to the application based on whether the shaking event is generated by the first or second panel; and
cause the application to turn pages forward or backward in response to the another user input.

* * * * *